(12) United States Patent
Chevalier

(10) Patent No.: US 9,115,285 B2
(45) Date of Patent: Aug. 25, 2015

(54) FILLERS, PIGMENTS AND MINERAL POWDERS TREATED WITH ORGANOPOLYSILOXANES

(75) Inventor: Pierre Chevalier, Lille (FR)

(73) Assignee: DOW CORNING CORPORATION, Midland, MI (US)

( * ) Notice: Subject to any disclaimer, the term of this patent is extended or adjusted under 35 U.S.C. 154(b) by 1208 days.

(21) Appl. No.: 12/441,436

(22) PCT Filed: Sep. 17, 2007

(86) PCT No.: PCT/EP2007/059803
§ 371 (c)(1),
(2), (4) Date: Aug. 25, 2009

(87) PCT Pub. No.: WO2008/034806
PCT Pub. Date: Mar. 27, 2008

(65) Prior Publication Data
US 2009/0318614 A1    Dec. 24, 2009

(30) Foreign Application Priority Data

Sep. 18, 2006 (GB) .................................. 0618186.1
May 17, 2007 (GB) .................................. 0709438.6

(51) Int. Cl.
| | |
|---|---|
| C08K 9/00 | (2006.01) |
| C08L 83/00 | (2006.01) |
| C09C 3/12 | (2006.01) |
| C09C 1/00 | (2006.01) |
| C09C 1/02 | (2006.01) |
| C09C 1/36 | (2006.01) |
| C09C 1/40 | (2006.01) |
| C09C 1/42 | (2006.01) |

(52) U.S. Cl.
CPC ................ *C09C 3/12* (2013.01); *C09C 1/0093* (2013.01); *C09C 1/024* (2013.01); *C09C 1/3684* (2013.01); *C09C 1/40* (2013.01); *C09C 1/42* (2013.01); *C01P 2004/84* (2013.01); *C01P 2006/60* (2013.01)

(58) Field of Classification Search
CPC .............. C09C 3/12; C09C 1/40; C09C 1/42; C09C 1/0093; C09C 1/0024
USPC ...................... 524/588, 3, 421, 413, 415, 423; 427/372.2; 523/200
See application file for complete search history.

(56) References Cited

U.S. PATENT DOCUMENTS

| | | | |
|---|---|---|---|
| 3,948,676 A | 4/1976 | Laufer | |
| 4,111,890 A * | 9/1978 | Getson et al. ................... 528/10 |
| 4,143,088 A * | 3/1979 | Favre et al. .................... 525/477 |
| 4,724,167 A | 2/1988 | Evans et al. | |
| 4,824,924 A | 4/1989 | Letoffe et al. | |
| 5,066,485 A | 11/1991 | Brieva et al. | |
| 5,352,751 A | 10/1994 | Cocco | |
| 5,679,725 A | 10/1997 | Fisher | |
| 5,728,794 A | 3/1998 | Friebe et al. | |
| 6,265,598 B1 | 7/2001 | Kimura et al. | |
| 6,380,301 B1 * | 4/2002 | Enami et al. ................... 524/588 |
| 2004/0063816 A1 | 4/2004 | Bergstrom et al. | |
| 2006/0194067 A1 | 8/2006 | Beger et al. | |

FOREIGN PATENT DOCUMENTS

| | | |
|---|---|---|
| EP | 0778307 A2 | 6/1997 |
| EP | 0959095 A2 | 11/1999 |
| EP | 1316589 A2 | 6/2003 |
| EP | 1454611 A2 | 9/2004 |
| JP | 4036370 | 2/1992 |
| JP | 9279031 A | 10/1997 |
| JP | 2004269817 A | 9/2004 |
| WO | WO 9963003 A1 | 12/1999 |
| WO | WO 0155030 A2 | 8/2001 |
| WO | WO 03043567 A2 | 5/2003 |
| WO | WO 2005039753 A1 | 5/2005 |
| WO | WO 2005099651 A1 | 10/2005 |

OTHER PUBLICATIONS

English language abstract for EP0959095 extracted from espacenet.com database, dated Jun. 23, 2009.
English language translation and abstract for JP 2004269817 extracted from PAJ database dated Jun. 23, 2009, 24 pages.
PCT International Search Report for PCT/EP2007/059803 dated Feb. 14, 2008, 4 pages.
Article: Spinu et al., Synthesis of Modified SiO2 Networks: Polydirnethylsiloxane-SiO2 Orgnaic-Inorganic Hybrids via Sol-Gel Chemistry, Journal of Inorganic and Organometallic Polymers, vol. 2, No. 1, 1992, pp. 103-128.
Article: Wypych, "Hand Book of Fillers—Influence of Fillers on Other Additives", Chem Tec Publishing, 2nd edition, 1999, pp. 545-549.
English language abstract for JP 04-036370 extracted from PAJ database on Apr. 12, 2012, 7 pages.
English language abstract for JP 9279031 extracted from the espacenet.com database on Apr. 9, 2012, 11 pages. Also see English language equivalent US 5,679,725.

* cited by examiner

*Primary Examiner* — Hannah Pak
(74) *Attorney, Agent, or Firm* — Howard & Howard Attorneys PLLC

(57) ABSTRACT

A filler, pigment or mineral powder surface treated with a silicon compound is described. The silicon compound is a polydiorganosiloxane having at least one terminal group of the formula —SiR"(OR')$_2$ or —Si(OR')$_3$, wherein R" represents an alkyl, substituted alkyl, alkenyl or aryl group and each R' represents an alkyl group having 1 to 4 carbon atoms. The filler, pigment or mineral powder treated is hydrophobic and is used in composites or industrial processes.

18 Claims, No Drawings

FILLERS, PIGMENTS AND MINERAL POWDERS TREATED WITH ORGANOPOLYSILOXANES

RELATED APPLICATIONS

This application claims priority to and all the advantages of International Patent Application No. PCT/EP2007/059803, filed on Sep. 17, 2007, which claims priority to Great Britain Patent Application No. GB 0618186.1 filed on Sep. 18, 2006, and Great Britain Patent Application No. GB 0709438.6 filed on May 17, 2007.

This invention relates to fillers, pigments and/or mineral powders rendered hydrophobic by treatment with organopolysiloxanes, to the process of treating the fillers, pigments and/or mineral powders with the organopolysiloxanes and to plastics or rubber compositions mixed with fillers and pigments and the organopolysiloxanes.

EP-A-1316589 describes a hydrophobic silica fine powder prepared by premixing a hydrophilic silica fine powder with a dimer diol siloxane or cyclic siloxane as a hydrophobizing agent, mixing them in a ball mill and thereafter heating at 100-300° C. in an ammonia or amine-containing atmosphere. EP-A-1454611 teaches the surface treatment of coloured cosmetic powders with hydrogenosilsesquioxane-alkylsilsesquioxane copolymers. WO-A-03/043567 describes organosilicon-treated cosmetic pigments or fillers treated with a linear reactive alkylpolysiloxane having substituted in repeating units in the backbone of the molecule both cationic and anionic groups, for example aminoethylaminopropyl and alkoxy groups. WO-A-2005/099651 describes a hybrid coating material and process for pigments and other powders, comprising an organometallate, for example a titanate, and a functionalized silicon compound, for example a trialkoxysilane or a functionalized polysiloxane, which covalently bond to each other and to the substrate powder.

WO 01/55030 describes preparing hydrophobic colloidal silica by a method comprising the steps of taking a colloidal silica dispersed in an aqueous dispersant, replacing a substantial amount of the aqueous dispersant with one or more hydrophilic organic solvent(s), preparing hydrophobic colloidal silica by reacting the colloidal silica with an hydrophobizing agent and replacing the liquid phase of the dispersion comprising the organic hydrophilic solvent with one or more hydrophobic organic solvent(s) to obtain hydrophobic colloidal silica dispersed in a hydrophobic organic solvent. U.S. Pat. No. 3,948,676 describes a process for preparing hydrophobic finely divided oxides of metals and/or oxides of silicon comprising activating finely divided particles of oxides of metals and/or oxides of silicon by heating the particles at about 700-1000 DEG C for less than about 60 seconds in a stream of inert gas to substantially completely free the particles of not only the physically bonded, but also the chemically bonded water, and contacting the activated particles with at least one organosilicon compound and substantially anhydrous ammonia gas for less than about 60 seconds.

US 2004/063816 and U.S. Pat. No. 4,724,167 describe silanol terminated oligosiloxanes used in the preparation of hydrophobic fillers. U.S. Pat. No. 4,111,890 and EP 0959095A describe the preparation of dialkoxy-terminated and trialkoxy-terminated polydiorganosiloxanes.

According to the invention a filler, pigment or mineral powder is surface treated with a silicon compound, characterised in that the silicon compound is a polydiorganosiloxane having at least one terminal group of the formula —SiR"(OR')$_2$ or —Si(OR')$_3$, wherein R" represents an alkyl, substituted alkyl, alkenyl or aryl group and each R' represents an alkyl group having 1 to 4 carbon atoms.

The treatment with the polydiorganosiloxane usually renders the filler, pigment or mineral powder more hydrophobic, as indicated for example by a contact angle test hereinafter described. The filler, pigment or mineral powder is therefore generally more free-flowing and resistant to caking in the presence of moisture. This is advantageous when the treated mineral powder is used in an industrial process as a processing aid in chemical or metallurgical process. When used in a plastics or rubber composition, a filler or pigment treated with a polydiorganosiloxane according to the invention generally has improved adhesion to and compatibility with the plastics or rubber matrix so that the composition has improved physical properties.

The polydiorganosiloxane having at least one terminal group of the formula —SiR"(OR')$_2$ or —Si(OR')$_3$ can be prepared by reacting a hydroxyl-terminated polydiorganosiloxane with an alkoxysilane of the formula R"Si(OR')$_3$ and/or a tetraalkoxysilane of the formula Si(OR')$_4$, in the presence of a catalyst for the condensation of silanol groups with Si-alkoxy groups. The hydroxyl-terminated polydiorganosiloxane from which the polydiorganosiloxane of the invention is prepared can be a substantially linear polydiorganosiloxane, or can be a branched polydiorganosiloxane containing T units of the formula SiR*O$_{3/2}$, where R* represents an alkyl, substituted alkyl, alkenyl or aryl group, and/or Q units of the formula SiO$_{4/2}$, provided that the polydiorganosiloxane contains a plurality of diorganosiloxane units. The diorganosiloxane units are preferably dimethylsiloxane units. For example the hydroxyl-terminated polydiorganosiloxane can be a polydimethylsiloxane having silanol groups at each end of the polydimethylsiloxane chain, or part or all of the polyorganosiloxane may have one silanol end group and one Si-alkoxy end group, for example a dimethylmethoxysilyl end unit. The diorganosiloxane units can additionally or alternatively to dimethylsiloxane units comprise methylphenylsiloxane units, alkylmethylsiloxane or dialkylsiloxane units in which the alkyl group has 2 or more, for example 2 to 12, carbon atoms, diphenylsiloxane units, methylvinylsiloxane units or methylaralkylsiloxane units. Methylphenylsiloxane units may be preferred for treating a filler or pigment to be used in a polymer composition designed to have gas barrier properties. Methylvinylsiloxane units may improve the adhesion of a treated filler or pigment to a polyolefin matrix.

The polydiorganosiloxane of the invention produced from this hydroxyl-terminated polydiorganosiloxane can for example be a substantially linear polydiorganosiloxane, such as polydimethylsiloxane, having —SiR"(OR')$_2$ groups or —Si(OR')$_3$ groups at each end of the polydimethylsiloxane chain. We believe that this is the main product when the alkoxysilane and hydroxyl-terminated polydiorganosiloxane are reacted at a molar ratio of the alkoxysilane R"Si(OR')$_3$ and/or Si(OR')$_4$ to silanol groups of the hydroxyl-terminated polydiorganosiloxane of about 1:1 or with a molar ratio of the alkoxysilane to silanol groups above 1:1. If the hydroxyl-terminated polydiorganosiloxane used as starting material contains T or Q branching, the polydiorganosiloxane of the invention produced from it will be branched.

When the molar ratio of the alkoxysilane R"Si(OR')$_3$ and/or Si(OR')$_4$ to silanol groups of the hydroxyl-terminated polydiorganosiloxane is less than 1:1, for example be in the range from 1:2 to 1:3, the polydiorganosiloxane of the invention may not only have —SiR"(OR')$_2$ groups or —Si(OR')$_3$ groups at the end of the chain but may also have —SiR"(OR')— groups or —Si(OR')$_2$ groups linking polydiorganosiloxane chains and also some R"SiO$_{3/2}$, R"OSiO$_{3/2}$ or SiO$_{4/2}$ resinous branching units derived from the multiple reaction of a molecule of an alkoxysilane of the formula R"Si(OR')$_3$, or a tetraalkoxysilane of the formula Si(OR')$_4$, with at least 3 silanol groups. Some branching and/or chain extension may occur when the molar ratio of the alkoxysilane R"Si(OR')$_3$ and/or Si(OR')$_4$ to silanol groups is about 1:1.

The hydroxyl-terminated polydiorganosiloxane reagent generally has a degree of polymerisation (DP) of at least 2 and preferably at least 4 or 6 siloxane units up to 30, 50 or 100 siloxane units. In one preferred embodiment, the hydroxyl-terminated polydiorganosiloxane reagent has a DP of 12. Such reagent is usually cheaper and less volatile than a corresponding hydroxyl-terminated polydiorganosiloxane of lower DP while being more reactive than a reagent of higher DP. The polydiorganosiloxane hydrophobing agent prepared from it may have a similar DP but often has an increased DP through chain extension of the siloxane chain. The polydiorganosiloxane hydrophobing agent may for example have a DP in the range from 4 or 6 up to 250 siloxane units. The polydiorganosiloxane hydrophobing agent is preferably a liquid, having for example a viscosity in the range 2 to 20000 centiStokes (mm$^2$/s) at 25° C., when it is to be used to pretreat a filler, pigment or mineral. The polydiorganosiloxane hydrophobing agent may be a liquid or a solid when it is to be mixed with an organic plastics or rubber matrix material at the same time as mixing with a filler or pigment.

In the alkoxysilane of the formula R"Si(OR')$_3$ which is reacted with the hydroxyl-terminated polydiorganosiloxane, R" preferably represents an alkyl, alkenyl or aryl group and each R' represents an alkyl group having 1 to 4 carbon atoms, particularly a methyl or ethyl group. The polydiorganosiloxane product thus preferably has at least one terminal group of the formula —SiR(OR')$_2$, wherein R represents an alkyl, alkenyl or aryl group and each R' represents an alkyl group having 1 to 4 carbon atoms. The group R can for example be an alkyl group having 1 to 20 carbon atoms, for example a methyl, ethyl, propyl, octyl, dodecyl group. Alkyl groups R having at least 3 carbon atoms, for example alkyl groups having 3 to 8 carbon atoms such as propyl, butyl, isobutyl, amyl, hexyl, octyl or 2-ethylhexyl, may be particularly effective in rendering fillers or pigments hydrophobic. The group R can alternatively be an alkenyl group having up to 20 carbon atoms such as vinyl or an aryl group such as phenyl. A mixture of alkoxysilanes of the formula RSi(OR')$_3$ can be reacted with the hydroxyl-terminated polydiorganosiloxane, for example alkoxysilanes having different alkyl and/or alkenyl and/or aryl groups R, so that the polydiorganosiloxane of the invention can contain different —SiR(OR')$_2$ groups on the same polymer chain. A mixture of trialkoxysilane and tetraalkoxysilane can be reacted with the hydroxyl-terminated polydiorganosiloxane to produce a polydiorganosiloxane containing —SiR(OR')$_2$ groups and —Si(OR')$_3$ groups. R" can alternatively be a substituted alkyl group such as haloalkyl, for example chloropropyl or trifluoropropyl, phenylmethyl, mercaptopropyl, aminoalkyl, for example aminopropyl, aminoethylaminopropyl, or vinylbenzylethylenediaminepropyl, vinylbenzyl, ureapropyl, glycidoxypropyl, methacryloxypropyl, propylmethylphosphonate, or a quaternary ammonium salt type functionality on the alkyl chain, for example octadecyl-propylammonium chloride. In general, treatment with a polydiorganosiloxane according to the invention renders the filler, pigment or mineral powder more hydrophobic, particularly when the group R" is a hydrocarbon group. For most organic polymers, making a filler more hydrophobic makes it more compatible with the polymer. For some polar polymers, a substituted alkyl group R" can be chosen to give optimum compatibility with the polymer.

Examples of tetraalkoxysilanes of the formula Si(OR')$_4$ which can be reacted with the hydroxyl-terminated polydiorganosiloxane are tetraethoxysilane(tetraethyl silicate) and tetramethoxysilane.

The alkoxysilane of the formula R"Si(OR')$_3$ or Si(OR')$_4$ is reacted with the hydroxyl-terminated polydiorganosiloxane in the presence of a catalyst for the condensation of silanol groups with Si-alkoxy groups. The catalyst can for example be an ester of a Group 4B or 5B metal such as a titanate ester, for example tetrabutyl titanate(titanium tetra(n-butoxide)) or tetrapropyl titanate or a chelated titanium ester. The reaction can be carried out at ambient temperature or pressure in the presence of the titanate ester catalyst; slightly elevated temperature can be used if desired. The polydiorganosiloxanes of the invention, particularly those prepared using a titanium ester catalyst, have a high reactivity with mineral fillers and pigments through Si-alkoxy groups and any remaining Si—OH groups and contain only a very low level of unreacted monomeric silane.

Alternative catalysts for the condensation of silanol groups with Si-alkoxy groups which can be used include aminosilanes, for example aminoalkyltrialkoxysilanes such as 3-aminopropyltrimethoxysilane, 3-aminopropyltriethoxysilane, (2-aminoethyl)-3-aminopropyltrimethoxysilane or 2-methyl-3-aminopropyltrimethoxysilane, and/or aminosiloxanes containing Si-bonded aminoalkyl groups, for example a polydiorganosiloxane terminated with 3-aminopropyldimethoxysilyl groups. Such an aminosilane can act both as the reagent R"Si(OR')$_3$ and as the silanol condensation catalyst. The aminosilane can be used as the only reagent R"Si(OR')$_3$ or the hydroxyl-terminated polydiorganosiloxane can be reacted with a mixture of an aminosilane R"Si(OR')$_3$ and another reagent of the formula R"Si(OR')$_3$, for example a mixture of propyltrimethoxysilane and 3-aminopropyltriethoxysilane. The product of the reaction may be a blend of the polydiorganosiloxane having at least one terminal group of the formula —SiR"(OR')$_2$ with unreacted aminosilane or aminosiloxane, and/or unreacted hydroxyl-terminated polydiorganosiloxane. Such a blend is generally effective as a hydrophobing agent for fillers, pigments and mineral powders without needing to separate the polydiorganosiloxane. The blend preferably comprises at least 50% by weight of the polydiorganosiloxane having at least one terminal group of the formula —SiR"(OR')$_2$ and up to 50% of the aminosilane or aminosiloxane.

Alcohol R'OH is released during the formation of the alkyl-silicate functional polydiorganosiloxane from the silane RSi(OR')$_3$ or Si(OR')$_4$ and the hydroxyl-terminated polydiorganosiloxane. The alcohol can advantageously be removed through stripping under reduced vacuum, heating or air degassing, to increase the extent of reaction and to capture the alcohol released. Any monomeric silane remaining unreacted at the end of the reaction can also be removed similarly.

The polydiorganosiloxane hydrophobing agent of the invention can be blended with an organosilicon resin, particularly an organosilicon resin containing Si—OH groups or Si-alkoxy groups. The organosilicon resin is generally a non-linear siloxane resin and preferably consists of siloxane units of the formula Z$_a$SiO$_{4-a/2}$ wherein Z denotes a hydroxyl, hydrocarbon or hydrocarbonoxy group, and wherein a has an average value of from 0.5 to 2.4. It preferably consists of monovalent trihydrocarbonsiloxy (M) groups of the formula Z$_3$SiO$_{1/2}$ with tetrafunctional (Q) groups SiO$_{4/2}$ and/or trifunctional groups of the formula ZSiO3/2 wherein Z denotes a monovalent hydrocarbon group or a hydroxyl or hydrocarbonoxy group. If the resin is an MQ resin, the number ratio of M groups to Q groups is preferably in the range 0.4:1 to 2.5:1

(equivalent to a value of a in the formula $Z_aSiO_{4-a/2}$ of 0.86 to 2.15), more preferably 0.5:1 to 1.1:1. A MT resin having a similar value of a can alternatively be used. The organosilicon resin (C) can be a solid at room temperature, or MQ resins having a M/Q ratio higher than 1.2, which are generally liquids, can be used. The organosilicon resin, if present, is preferably present in a weight ratio of 2:98 to 40:60 with respect to the polydiorganosiloxane having a terminal group of the formula —SiR"(OR')$_2$ or —Si(OR')$_3$ more preferably 5:95 up to 20:80 and particularly about 10:90. The presence of the organosilicon resin may be preferred for treating a filler to be used in a cured moulded plastics material, since it may aid in strengthening the moulded structure.

Such a branched organosilicon resin $Z_aSiO_{4-a/2}$ wherein at least some groups Z are hydroxyl or hydrocarbonoxy, and wherein a has an average value of from 0.2 to 2.4, can alternatively be reacted with the hydroxyl-terminated polydiorganosiloxane and alkoxysilane of the formula R"Si(OR')$_3$ and/or Si(OR')$_4$, during preparation of the polydiorganosiloxane treatment agent of the invention to produce a branched polydiorganosiloxane treatment agent. The branched organosilicon resin is preferably reacted simultaneously with the hydroxyl-terminated polydiorganosiloxane and the alkoxysilane but can alternatively be reacted with the hydroxyl-terminated polydiorganosiloxane before the polydiorganosiloxane is reacted with the alkoxysilane.

Preferably, the polydiorganosiloxane used in the invention has more than one, preferably two, or even more than two terminal groups of the formula —SiR"(OR')$_2$ or —Si(OR')$_3$. The presence of more alkoxy groups SiR"(OR')$_2$ or —Si(OR')$_3$ on the treating polydiorganosiloxane has a favourable effect on the hydrophobing of the treated particles and helps to produce a filler, pigment or mineral powder with appropriate surface. Such surface can result from a chemical bonding, for example covalent bonding, of the treating agent with the filler, pigment or mineral powder, or from an at least partial coverage of the filler, pigment or mineral powder via hydrolysis-condensation of the alkoxy groups into a resin-like surface of enhanced compatibility with an organic plastics or rubber matrix material.

Examples of mineral fillers or pigments which can be treated according to the invention include titanium dioxide, aluminium trihydroxide (also called ATH), magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, aluminium oxide, antimony pentoxide, antimony trioxide, beryllium oxide, chromium oxide, iron oxide, lithopone, boric acid or a borate salt such as zinc borate, barium metaborate or aluminium borate, mixed metal oxides such as aluminosilicate, vermiculite, silica including fumed silica, fused silica, precipitated silica, quartz, sand, and silica gel; rice hull ash, ceramic and glass beads, zeolites, metals such as aluminium flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, ceramic or glass beads, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophillite, sepiolite, zinc stannate, zinc sulphide or wollastonite. The invention is not limited to the treatment of mineral fillers and pigments; other fillers which may require hydrophobic treatment to increase their compatibility with organic polymer matrices, for example natural fibres such as wood flour, wood fibres, cotton fibres or agricultural fibres such as wheat straw, hemp, flax, kenaf, kapok, jute, ramie, sisal, henequen, corn fibre or coir, nut shells or rice hulls, lignin, starch, or cellulose and cellulose-containing products, or certain synthetic fibres such as aramid fibres, nylon fibres, cotton fibres or glass fibres, or plastic microspheres of polytetrafluoroethylene or polyethylene and the invention includes treatment of such fillers. The filler can be a solid organic pigment such as those incorporating azo, indigoid, triphenylmethane, anthraquinone, hydroquinone or xanthine dyes, or a solid organic flame retardant such as polychlorobiphenyl or decabromodiphenyl oxide or a phosphorus-containing flame retardant.

The polydiorganosiloxane of the invention is usually applied to the filler, pigment or mineral powder at least 0.1 or 0.5% by weight up to 5 or 10% by weight, for example in the range 0.5 to 3% by weight polydiorganosiloxane on filler, pigment or mineral powder. More than one polydiorganosiloxane according to the invention can be applied to the filler, pigment or mineral powder if desired, for example polydiorganosiloxanes having different alkyl groups R in the terminal group of the formula —SiR(OR')$_2$. The polydiorganosiloxane can be applied in various ways. For example the polydiorganosiloxane can be applied by spray or dropwise addition to a stirred powder, or it can be mixed with filler in solvent followed by drying. More than one filler and/or pigment can be treated simultaneously with the polydiorganosiloxane, particularly if they are to be used in the same plastics or rubber composition. It may be advantageous to add the polydiorganosiloxane before the filler, pigment or mineral has been reduced to the desired particle size, so that the filler, pigment or mineral can be pulverised in the presence of the polydiorganosiloxane.

The invention includes a process for producing a plastics or rubber composition, characterised in that an organic plastics or rubber matrix material is mixed with a filler or pigment and a polydiorganosiloxane having at least one terminal group of the formula —SiR"(OR')$_2$ or —Si(OR')$_3$ as defined above. By an organic plastics or rubber material we mean a material based on carbon chemistry, that is a polymer in which at least half the atoms in the polymer backbone are carbon atoms.

The filler or pigment thus treated can be subsequently mixed with a plastics or rubber matrix. The polydiorganosiloxane of the invention can alternatively be applied to the filler or pigment as it is being processed, so that a plastics or rubber matrix material is mixed with a filler or pigment and with the polydiorganosiloxane. For example the polydiorganosiloxane can be added during preparation of a filler/polymer masterbatch, or it can be added to a filler/polymer composite before or during a processing step involving thorough mixing, for example an extrusion step. If a liquid polydiorganosiloxane treatment agent is mixed with a plastics or rubber matrix material at the same time as mixing with the filler or pigment, the polydiorganosiloxane can be added on a carrier, for example on a porous solid carrier or blended with a wax which can melt during extrusion mixing to aid dispersion of the polydiorganosiloxane in the composition.

Treatment with the polydiorganosilane of the invention increases the hydrophobicity of the filler or pigment and renders it more compatible with rubber or plastics materials, so that it improves the dispersion in a plastics or rubber matrix. Improved compatibility and dispersion in polymeric matrices improve mixing during processing (energy saving through reducing viscosity) and improve the final properties of the filled plastics or rubber composite. When the filler or pigment is used to impart a desired property such as mechanical strength, fire resistance or abrasion resistance to the plastics or rubber composition containing it, that property is generally increased when using treated compared to untreated filler or pigment. Silanes such as alkyl or alkenyl trialkoxy silanes have been used to treat fillers and pigments to render them hydrophobic, but tend to become volatilized because of their high vapour pressure during dry mixing with the filler or pigment due to heat generated and/or during drying of the treated filler or pigment. The polydiorganosilanes used according to the invention have lower vapour pressure and are not substantially volatilized during mixing or drying, so that the increased hydrophobicity of the mineral filler or pigment is retained until it is incorporated into the plastics or rubber composition. The polydiorganosilanes of the invention have a vapour pressure lower than 2000 Pa at 25° C., usually lower than 1000 Pa and particularly lower than 500 Pa at 25° C. The polydiorganosilanes of the invention have a boiling point higher than 110° C. at atmospheric pressure, usually higher than 160° C. and preferably higher than 200° C. at atmospheric pressure.

The treated filler or pigment can be incorporated into compositions based on a wide variety of plastics or rubber materials. The plastics material can be thermoplastic, for example a polyolefin such as polypropylene or a propylene copolymer, polyethylene, polymethylpentene, chlorinated polyethylene, fluorinated ethylene propylene copolymer, an ethylene chlorotrifluoroethylene copolymer, an ethylene tetrafluoroethylene copolymer, an ethylene ethyl acetate copolymer or a cyclic olefin copolymer, a vinyl polymer such as polyvinyl chloride (PVC), chlorinated PVC, polyvinylidene chloride, polyvinylidene fluoride or ethylene vinyl acetate copolymer or ethylene vinyl alcohol copolymer (EVA), an acrylic polymer such as polymethylmethacrylate or a styrene methyl methacrylate copolymer, polyacrylonitrile or a styrene acrylonitrile copolymer, or an acrylonitrile styrene acrylate copolymer or a blend thereof with polycarbonate or PVC, a tetrafluoroethylene perfluoropropylene copolymer, a polyester such as polybutylene terephthalate or polyethylene terephthalate, a polyamide or polyamide-imide or polyimide or polyarylamide or polyetherimide or impact modified polyamide, a polyurethane, polystyrene or a styrene maleic anhydride copolymer, polyarylate, polysulfone, polyetheretherketone, aliphatic polyketone, polyethersulfone, polyphenylene ether, polyphenylene sulphide, polyphenylene sulfone, polyoxymethylene, polypyrrole or polycarbonate, or a cellulosic polymer such as cellulose acetate, cellulose acetate butyrate or cellulose propionate, or thermosetting, for example an unsaturated polyester, an alkyd resin, a polyurethane, an epoxy resin, a phenolic resin or an amino-formaldehyde resin, or can be an ionomer or a liquid crystalline polymer. Examples of rubber materials include natural rubber, synthetic diene rubbers such as polybutadiene, polyisoprene, polychloroprene, polyisobutylene or a butadiene styrene copolymer, an acrylonitrile butadiene styrene (ABS) copolymer or a blend thereof with polycarbonate, or a methacrylate acrylonitrile butadiene styrene copolymer, block copolymer rubbers, butyl rubber, nitrile rubber or an ethylene propylene copolymer (EPDM) rubber, or a blend of any of the above rubbers with a thermoplastic resin such as a polyolefin, polyphenylene ether or polystyrene, including TPO blends of a thermoplastic polyolefin such as polypropylene with an olefinic elastomer having low or no diene unsaturation such as EPDM. The concentration of filler or pigment in such filled compositions can vary widely; for example the treated filler or pigment can form from 1 or 2% up to 80 or 90% by weight of the composition. The filled plastics and rubber compositions can for example be used in applications such as wire & cable sheathing, packaging, automotive & appliance parts, sealants and adhesives for construction, coatings, construction materials, nonwoven fabrics, agricultural film or drainage pipes One specific example of a filler treated according to the invention is aluminium trihydroxide used in polyethylene or EVA for cable and wiring insulation to enhance flame resistance. Polyethylene containing aluminium trihydroxide treated with a polydiorganosiloxane according to the invention had a limiting oxygen index 3% higher than polyethylene containing aluminium trihydroxide treated with a conventional coupling agent.

Further examples of fillers treated according to the invention include milled silica for use as a reinforcing filler in polyurethane sealant and adhesives in the construction industry, titanium dioxide for use as a whitening agent and/or UV absorber in PVC, for example for window profiles, or in polypropylene, polyethylene or ABS, calcium carbonate for use in polypropylene packaging, PVC window profiles or PVC or polyethylene pipes, magnetic powders for use in plastic or rubber matrices in electrical appliances and glass microbeads for use as reflection material in an organic coating binder for transport signs. Kaolin treated according to the invention is used in PVC for wire and cable applications to improve solvent resistance, dimensional stability and electrical properties, and is also used in PVC for car mats. Talc treated according to the invention is used in polypropylene for automotive parts such as panels or trim, or in TPO blends for automotive bumpers, to improve stiffness and reduce heat distortion and mould shrinkage, or in chlorinated polyethylene for cable insulation. Talc, silica or calcium carbonate can be treated according to the invention and used in polyolefins such as polyethylene, polypropylene or polystyrene for food grade packaging as an anti-blocking agent. Talc or glass fibre can be treated according to the invention and used in polycarbonate for electrics casings to improve stiffness. Mica treated according to the invention can be used in polypropylene for injection moulded packaging to improve dielectric, thermal and mechanical properties, whiteness and transparency or for agriculture film, drainage pipes, non-woven, rope & geo-lattices. Wollastonite treated according to the invention can be used in polypropylene for automotive instrument panels, fascia and trim to improve stiffness and flexural strength. Carbon black and/or silica can be treated according to the invention for incorporation in rubber tyre tread to improve mechanical performance. Clay, talc and/or titanium dioxide can be treated for incorporation in the white side wall of a tyre to improve hardness, stress-strain properties and resistance to tear. Clay, talc, mica or calcium carbonate can be treated according to the invention for incorporation in the rubber inner liner of a tyre to ensure good air retention. Wood flour can be treated according to the invention for incorporation in polypropylene, polyethylene or PVC to improve mechanical properties, durability and weather resistance when used for decking, pallets, outdoor or interior furniture or automotive door panels. Stabilising fillers for PVC, for example zinc carboxylates such as a mixed zinc calcium stearate, or hydrotalcite, can be treated according to the invention, optionally in combination with calcium carbonate and/or titanium dioxide.

Besides producing treated pigments or fillers intended for use in plastics or rubbers, the invention permits to obtain treated mineral powders very useful in other areas, especially industrial processes, like chemical or metallurgic industrial processes for example. A treatment according to the invention enhances the hydrophobicity of the mineral powder. Therefore, it can make the mineral filler more free-flowing and resistant to caking in the presence of moisture, for example if the mineral powder is required to be stored in and dispensed from a hopper. Therefore, in another preferred embodiment, a mineral powder according to the invention is used as a processing aid in a chemical or metallurgic process.

Examples of mineral powders that can be treated according to the invention include calcium oxide (quick lime), which is used in treating pig iron to capture sulphur or sulphide compounds which is unwanted in the final steel produced. Treatment with a polydiorganosiloxane according to the invention, for example at 0.05 to 0.1% by weight, inhibits hydrolysis to calcium hydroxide and improves the fluidity of the powder, helping to keep the calcium oxide free-flowing and to stop caking on storage. Magnesium oxide, which is also used in treating pig iron, can also be treated with a polydiorganosiloxane according to the invention to keep it free-flowing. Titanium dioxide and/or calcium carbonate powders adding during papermaking to whiten the paper can also be treated with a polydiorganosiloxane according to the invention to keep them free-flowing and to improve whiteness of the paper.

The polydiorganosiloxane used according to the invention for treating fillers, pigments and/or mineral powders may present the significant benefits over traditional organo trialkoxysilanes surface treating agents, of being more often lower cost to produce, of being lower to even non toxic as well as to releasing upon treatment substantially lower alcohol level (VOC). The latter is an advantage for safety & environmental reasons especially as low VOC processes (low Volatile Organic Content) are nowadays of increased importance for the industries under more and more stringent HSE regulations.

Moreover, the polydiorganosiloxane according to the invention offers significant ease of process and reduced processing time. Indeed it requires reduced drying step to remove alcohol generated after treatment of fillers, pigments and/or mineral powders as well as less venting time during extrusion when the polydiorganosiloxane of the invention is applied to fillers, pigments and/or mineral powders during processing with the plastic or rubber matrix.

Altogether the polydiorganosiloxane of the invention may offer substantial advantages in terms of energy saving, cost reduction, ease of processing, health, safety and environment benefits.

As an example the vinyltris(2-methoxyethoxy)silane, considered as toxic, used for the treatment of fillers is advantageously replaced by the n-propyldiethoxysilyl-terminated polydimethysiloxane of the invention (DP 16), classified as not toxic and releasing upon treatment 7 times less alcohol than vinyltris(2-methoxyethoxy)silane.

The invention is illustrated by the following Examples Preparation of Organopolysiloxanes:

288 g of hydroxy-terminated polydimethylsiloxane of DP 12.6 was stirred with 104 g of n-propyltrimethoxysilane for a few minutes under nitrogen. 2 g of titanium n-butoxide were then added under stirring. The mixing was continued until the product became totally homogeneous. Characterization of the polymer product A1 confirmed the formation of n-propylsilicate functional polydimethylsiloxane of main group structure —SiR(OR')$_2$ wherein R is propyl and each R' is methyl with average molecular weight of 1,700 determined by GPC and average DP of 15 to 19 upon the reaction time as determined by NMR. Branched units —SiR(OR')O$_{0.5}$ and —SiRO$_{1.0}$ were also observed as part of the final product. Alternatively, methanol formed was stripped at atmospheric pressure or under reduced pressure.

100 g of hydroxy-terminated oligodimethylsiloxane of DP 4.2 was stirred with 90 g of vinyltrimethoxysilane for a few minutes under nitrogen. 3.9 g of titanium n-butoxide were then added under stirring. The mixing was continued until the product became totally homogeneous and was further heated up to 40° C. until reaction completion. Characterization by NMR of the oligomer product A2 confirmed the formation of vinylsilicate functional polydimethylsiloxane of main group structure —SiR(OR')$_2$ wherein R is vinyl and each R' is methyl with average DP of 6.2 as determined by NMR. Branched units —SiR(OR')O$_{0.5}$ and —SiRO$_{1.0}$ were also observed as part of the final product.

1108 g of hydroxy-terminated polydimethylsiloxane of DP 12.6 was stirred with 362 g of vinyltrimethoxysilane for a few minutes under nitrogen. 30 g of titanium n-butoxide were then added under stirring. The mixing was continued until the product became totally homogeneous. Characterization by NMR of the polymer product A3 confirmed the formation of vinylsilicate functional polydimethylsiloxane of main endgroup structure —SiR(OR')$_2$ wherein R is vinyl and each R' is methyl with average DP of 15 as determined by NMR. Group structures such as linked —SiR(OR')— and branched unit —SiRO$_{1.0}$ were also observed as part of the final product.

164 g of hydroxy-terminated polydimethylsiloxane of DP 53.3 was stirred with 12.3 g of vinyltrimethoxysilane for a few minutes under nitrogen. 3.6 g of titanium n-butoxide were then added under stirring. The mixing was continued until the product became totally homogeneous and was further heated up to 40° C. until reaction completion. Characterization by NMR of the polymer product A4 confirmed the formation of vinylsilicate functional polydimethylsiloxane of main group structure —SiR(OR')$_2$ wherein R is vinyl and each R' is methyl with average DP of 79 as determined by NMR. Branched units —SiR(OR')O$_{0.5}$ and —SiRO$_{1.0}$ were also observed as part of the final product.

320 g of hydroxy-terminated oligodimethylsiloxane of DP 4.2 was stirred with 412 g of aminopropyltriethoxysilane for a few minutes under nitrogen. No further condensation catalyst was added. The mixing was continued until the product became totally homogeneous and was further heated up to 40° C. until reaction completion. Characterization by NMR of the oligomer product A5 confirmed the formation of aminopropylsilicate functional polydimethylsiloxane of main group structure —SiR(OR')$_2$ wherein R is aminopropyl and each R' is ethyl with average DP of 7.4 as determined by NMR. Branched units —SiR(OR')O$_{0.5}$ and —SiRO$_{1.0}$ were also observed as part of the final product.

5462 g of hydroxy-terminated polydimethylsiloxane of DP 12.6 was stirred with 2539 g of aminopropyltriethoxysilane for a few minutes under nitrogen. No further condensation catalyst was added. The mixing was continued until the product became totally homogeneous. Characterization by NMR of the polymer product A6 confirmed the formation of aminopropylsilicate functional polydimethylsiloxane of main group structure —SiR(OR')$_2$ wherein R is aminopropyl and each R' is ethyl with average DP of 17 as determined by NMR. Branched units —SiR(OR')O$_{0.5}$ and —SiRO$_{1.0}$ were also observed as part of the final product.

100 g of hydroxy-terminated polydimethylsiloxane of DP 12.6 was stirred with 42.4 g of phenyltrimethoxysilane for a few seconds under nitrogen. 2.5 g of titanium n-butoxide were then added under stirring. The mixing was continued until the product became totally homogeneous. Characterization by NMR of the polymer product A7 confirmed the formation of phenylsilicate functional polydimethylsiloxane of main group structure —SiR(OR')$_2$ wherein R is phenyl and each R' is methyl with average DP of 16 as determined by NMR. Branched units —SiR(OR')O$_{1.0}$ and —SiRO$_{1.0}$ were also observed as part of the final product.

100 g of hydroxy-terminated polydimethylsiloxane of DP 12.6 was stirred with 32.5 g of tetramethoxysilane for a few seconds under nitrogen. 2.5 g of titanium n-butoxide were then added under stirring. The mixing was continued until the product became totally homogeneous. Characterization by NMR of the polymer product A8 confirmed the formation of methoxysilicate functional polydimethylsiloxane of main group structure —Si(OR')$_3$ wherein R' is methyl with average DP of 15 as determined by NMR. Branched units —Si(OR')O$_{1.0}$ and —SiO$_{1.5}$ were also observed as part of the final product.

100 g of hydroxy-terminated polydimethylsiloxane of DP 12.6 was stirred with 53 g of methacryloxypropyltrimethoxysilane for a few seconds under nitrogen. 3 g of titanium n-butoxide were then added under stirring. The mixing was continued until the product became totally homogeneous. Characterization by NMR of the polymer product A9 confirmed the formation of methacryloxypropylsilicate functional polydimethylsiloxane of main group structure —SiR(OR')$_2$ wherein R is methacryloxypropyl and each R' is methyl with some branched units —SiR(OR')O$_{1.0}$ and —SiRO$_{1.0}$ also observed as part of the final product as determined by NMR.

100 g of hydroxy-terminated polydimethylsiloxane of DP 12.6 was stirred with 50.5 g of glycidoxypropyltrimethoxysilane for a few seconds under nitrogen. 3 g of titanium n-butoxide were then added under stirring. The mixing was continued until the product became totally homogeneous. Characterization by NMR of the polymer product A10 confirmed the formation of glycidoxypropylsilicate functional polydimethylsiloxane of main group structure —SiR(OR')$_2$ wherein R is glycidoxypropyl and each R' is methyl with some branched units —SiR(OR')O$_{1.0}$ and —SiRO$_{1.0}$ also observed as part of the final product as determined by NMR.

190 g of hydroxy-terminated dimethyl/vinylmethyl-siloxane co-polymer was stirred with 228 g of aminopropyltriethoxysilane for a few minutes under nitrogen. No further condensation catalyst was added. The mixing was continued until the product became totally homogeneous. Characterization by NMR of the polymer product A11 confirmed the formation of aminopropylsilicate functional dimethyl/vinylmethyl-siloxane co-polymer.

600 g of hydroxy-terminated polydimethylsiloxane of DP 12.6 was stirred with 77.1 g of vinyltrimethoxysilane for a few minutes under nitrogen. 13.5 g of titanium n-butoxide were then added under stirring. The mixing was continued until the product became totally homogeneous. Characterization by NMR of the polymer product A12 confirmed the formation of highly condensed vinylsilicate functional polydimethylsiloxane with the main branched group structures being —SiRO$_{0.5}$OR' and —SiRO$_{1.0}$ wherein R is vinyl and each R' is methyl.

600 g of hydroxy-terminated polydimethylsiloxane of DP 12.6 was stirred with 63.2 g of tetramethoxysilane and 65 g of vinyltrimethoxysilane for a few minutes under nitrogen. 14.6 g of titanium n-butoxide were then added under stirring. The mixing was continued until the product became totally homogeneous. Characterization by NMR of the polymer product A13 confirmed the formation of highly condensed vinyl and methoxysilicate functional poly-dimethylsiloxane with the main branched group structures being —SiRO$_{0.5}$(OR', —SiO$_{0.5}$(OR')$_2$ and —SiO$_{1.0}$OR' wherein R is vinyl and each R' is methyl.

Treatment of Fillers 300 g samples of TiO2 (Example 1), aluminium hydroxide (Example 2), mica (Example 3), calcined kaolin (Example 4), natural hydrophilic kaolin (Example 5), wood flour (Example 6) and calcium carbonate (Example 7) powders were each treated by dropwise addition of the n-propylsilicate functional polydimethylsiloxane A1 in a mixer at a loading of 1 and 3 wt %. The treated powders were then further dried at 70° C. to 120° C. for 1 to 2 hours. Each of the powders was initially dispersible in water. All of the powders became after treatment hydrophobic, floating on water.

The contact angle of droplet of water (1 µl) was also measured on pressed disk of titania treated with 3% n-propylsilicate functional polydimethylsiloxane A1 (Example 1) and compared to untreated titania. No contact angle could be observed for untreated titania since it was hydrophilic whereas after treatment a contact angle above 135° was measured. Contact angles of hydrophilic kaolin (Example 5), calcined kaolin (Example 4), ATH (Example 2), mica (Example 3), silica (Example 8) and wood flour (Example 9) treated with n-propylsilicate functional polydimethylsiloxane A1 were similarly measured to be very high, respectively: 132, 135, 129, 118, 129 and 130°.

Each of the treated powders was further heated at 150° C. No degradation of properties was observed.

Hydrophilic talc, PR8218 from Rio Tinto, was treated with 1% of each of the following materials, and the treated powder was subsequently dried at 120° C. for 1 hour.

COMPARATIVE EXAMPLE C1 vinyltris(2-methoxyethoxy)silane, a Known Hydrophobing Agent

COMPARATIVE EXAMPLE C2

Hydroxy-Terminated Polydimethylsiloxane of Dp 12.6

EXAMPLE 10

Vinylsilicate Functional Polydimethylsiloxane A3

Water droplet contact angles were measured as described before and were

| Example | C1 | C2 | 10 |
| --- | --- | --- | --- |
| Contact angle | 86 | 98 | 128 |

Water droplet contact angles were very much improved using organosilicate functional polydimethylsiloxanes according to the invention compared to known surface treating agents C1 and C2. This improvement of surface hydrophobicity and reduction of surface energy of the treated powders are critical to reduce filler agglomeration and enhance the filler dispersion & compatibilisation in polymer matrices for improved composite performances.

Hydrophilic Millicarb ground calcium carbonate from Omya, was treated with 1% of each of the following materials, and the powder was subsequently dried at 120° C. for 1 hour.

COMPARATIVE EXAMPLE C3 vinyltris(2-methoxyethoxy)silane, a Known Hydrophobing Agent

EXAMPLE 11

N-Propylsilicate Functional Polydimethylsiloxane A1

EXAMPLE 12

Aminopropyl-Silicate Functional Polydimethylsiloxane A6

Water droplet contact angles were measured as described before and were

| Example | C3 | 11 | 12 |
|---|---|---|---|
| Contact angle | 52 | 122 | 125 |

Water droplet contact angles were very much improved (treated calcium carbonate more hydrophobic) using organosilicate functional polydimethylsiloxanes according to the invention compared to known vinyltris(2-methoxyethoxy)silane.

Fibreglass DUCS (Dry Used Chopped Strands) DS 2100 13P from Owens Corning were calcinated at 500° C. for 4 hours and treated with 1% of each of the following materials. The treated fibreglass DUCS were subsequently dried at 120° C. for 1 hour.

COMPARATIVE EXAMPLE C4 vinyltris(2-methoxyethoxy)silane, a Known Hydrophobing Agent

EXAMPLE 13

N-propylsilicate Functional Polydimethylsiloxane A1

EXAMPLE 14

Vinylsilicate Functional Polydimethylsiloxane A3

Water droplet contact angles were measured as described before and were

| Example | C4 | 13 | 14 |
|---|---|---|---|
| Contact angle | 42 | 137 | 115 |

Water droplet contact angles were very much improved (treated fibreglass DUCS more hydrophobic) using organosilicate functional polydimethylsiloxanes according to the invention compared to known vinyltris(2-methoxyethoxy)silane.

Hydrophilic ATH was treated with 1% of each of the following materials and the treated powder was subsequently dried at 70° C. for 1 hour:

COMPARATIVE EXAMPLE C5 vinyltris(2-methoxyethoxy)silane, a Known Hydrophobing Agent

COMPARATIVE EXAMPLE C6

Hydroxy-Terminated Polydimethylsiloxane of Dp 12.6

EXAMPLE 15

N-propylsilicate Functional Polydimethylsiloxane A1

EXAMPLE 16

Vinylsilicate Functional Polydimethylsiloxane A3

EXAMPLE 17

Aminopropylsilicate Functional Polydimethylsiloxane A6

EXAMPLE 18

Methacryloxypropylsilicate Functional Polydimethylsiloxane A9

EXAMPLE 19

Glycidoxypropylsilicate Functional Polydimethylsiloxane A10

EXAMPLE 20

Aminopropylsilicate Functional Polydimethyl/Vinylmethylsiloxane Co-Polymer A11

EXAMPLE 21

Vinylsilicate Functional Polydimethylsiloxane A12

EXAMPLE 22

Vinyl and Methoxysilicate Functional Poly-dimethylsiloxane A13

Water droplet contact angles were measured as described before and were

| | Example | | | | | | | | |
|---|---|---|---|---|---|---|---|---|---|
| C5 | C6 | 15 | 16 | 17 | 18 | 19 | 20 | 21 | 22 |
| Contact angle 48 | 94 | 105 | 114 | 122 | 111 | 112 | 127 | 118 | 135 |

Water droplet contact angles were very much improved (treated ATH more hydrophobic) using organosilicate functional polydimethylsiloxanes according to the invention compared to known vinyltris(2-methoxyethoxy)silane or to hydroxy-terminated polydimethylsiloxane.

Hydrophilic ATH was treated with 1% of each of the organosilicate functional polydimethylsiloxanes A2, A5, A7 and A8 prepared above. In each experiment the ATH became after treatment hydrophobic, floating on water.

Fillers, pigments and/or mineral powders such as TiO2, aluminium hydroxide, mica, calcined kaolin, kaolin, wood flour, calcium oxide and calcium carbonate powders rendered hydrophobic after treatment according to the process described before were very much more free-flowing and resistant to caking compared to untreated powders. Free-flowing and resistance to caking are important properties to ease storage, handling and processes where gravimetric forces are involved such as gravimetric addition in a feeding hoper in extrusion or mixing machine for e.g. plastic and rubber compounding as well as in industrial processes such as in metal foundries, glass and ceramics industries.

The contact angle of droplet of water (1 µl) was measured on pressed disk of CaO treated with 1% n-propylsilicate functional polydimethylsiloxane A1 and compared to untreated CaO. No contact angle could be observed for untreated CaO since it was hydrophilic whereas after treatment a contact angle above 118° was measured. Free-flowing property and anti-caking of the treated powder was also very much improved compared to the untreated CaO.

Preparation of Composites Containing Treated Particles of Filler, Pigment or Mineral Powder in a Polymer Matrix.

Here follow examples of the benefits of hydrophobing filler, pigment and/or mineral powders via treatment to improve the compatibility and dispersion in polymeric matrices. It is known that increased compatibility or interaction and dispersion of fillers in plastic or rubber matrix improves processing, as well as the overall final performances of the filled plastic or rubber composites ("Handbook of Fillers", George Wypych, $2^{nd}$ Edition, ChemTec Publishing & Plastics Design Library, 1999, pages 545-549 and references therein) in a variety of applications. Those applications are for example, but not limited to, building windows & profiles, wire & cable jacketing, packaging films and bags for e.g. calcium carbonate in PVC or PE; building flooring, electrical and electronic components, aerospace for silica in e.g. epoxy, silicone and rubbers; automotive bumpers, dashboard and interiors for talc and kaolin in e.g. polypropylene; wire and cable for ATH and MDH in e.g. EVA; electrical components, printed circuit board, automotive engine covers for fibre glass in e.g. polyamide, epoxy and nylon; healthcare & medical, wire & cable jacketing for montmorillonite in e.g. polypropylene.

The following examples demonstrate the properties benefits of using a surface treating agent as per the invention compared to none or to conventional surface treating agents for filler, pigments and/or mineral powders such as mica in plastics. Improvements of whiteness, transparency, yellowness and mechanical properties are demonstrated, which are critical for applications where mica is used such as in thermoplastics and thermoset composites e.g. in polypropylene for domestic appliances, automotive panels and trims, crates, films, household storage containers, luggage, twine and rope and woven bag and in polyamides for bearings, carpets, gears, mechanical components in cameras, domestic appliances, and medical supplies as well as oil seals and tire cords, etc.

Reduced yellowness, whiteness improvement and easy color matching is also critical for usual pigments or whiteners such as TiO2, calcium carbonate, talc, ATH, MDH, etc.

Mica was pre-treated as per the procedure described before [with 1.5 wt % of n-propylsilicate functional polydimethylsiloxane A1 compared to vinyltris(2-methoxyethoxy)silane C7, hydroxyl-terminated polydimethylsiloxane C8, vinylbenzylethylene diaminepropyltrimethoxysilane monohydrochloride C9 and to untreated mica.

In a co-rotating twin screw extrusion machine (Brabender TSE 20/40) fitted with dosing feeders were compounded 20 wt % of untreated or treated mica, 79.9% of PP (Total Petrochemicals Polypropylene PPC7760 and Eltex P HV001 PF), 0.1% of antioxidant (Hostanox 010 FF). The composite was further moulded into plates or dumbbell samples using an injection moulding machine (Engel Victory 200/80 Tech) for further testing. Mechanical testing was performed on a Zwick 1445 tensile machine. The yellowness index was calculated according to the ASTM D1925-70 standard method.

| Surface treating agent | Elongation at break (%) | Yellowness Index |
| --- | --- | --- |
| Untreated | 40 | 29.0 |
| C9 | 22 | 35 |
| A1 | 49 | 26 |

The untouched Charpy impact strength was also carried out on a CEAST RESIL Impactor 6960.000.

| Surface treating agent | Charpy unotched Impact strength (kJ/m2) |
| --- | --- |
| Untreated | 50 |
| C7 | 58 |
| C8 | 56 |
| A1 | 68 |

Addition of propylsilicate functional polydimethylsiloxane A1 compared to conventional treating agents and to untreated mica is improving the elongation at break as well as the impact strength, while preserving tensile modulus and strength properties and reducing yellowing index.

Mica was pre-treated as per the procedure described before with 1.5 wt % of n-propylsilicate functional polydimethylsiloxane A1, vinylsilicate functional polydimethylsiloxane A3 in comparison with vinyltris(2-methoxyethoxy)silane C10, hydroxyl-terminated polydimethylsiloxane C11, vinyltrimethoxysilane C12, and to untreated mica.

In a co-rotating twin screw extrusion machine (Brabender TSE 20/40) fitted with dosing feeders were compounded 10 wt % of untreated or treated mica, 89.9% of PP (Total Petrochemicals Polypropylene PPC7760 and Eltex P HV001PF), 0.1% of antioxidant (Hostanox 010 FF). The composite was further moulded into plates or dumbbell samples using an injection moulding machine (Engel Victory 200/80 TECH) for further testing.

Mechanical Testing was Performed on a Zwich 1445 Tensile Machine.

| Surface treating agent | Elongation at break (%) |
| --- | --- |
| Untreated | 45 |
| C10 | 45 |
| C11 | 44 |
| C12 | 43 |
| A1 | 61 |
| A3 | 57 |

Addition of organosilicate functional polydimethylsiloxane A1 & A3 are improving the elongation at break of the composite while preserving tensile modulus and strength properties as well as reducing the yellowing index from 21 for A1 compared to 33 for the untreated mica filled composite and improving the whitening index.

The following example demonstrates the properties benefits of using a surface treating agent as per the invention compared to conventional agents for filler, pigments and/or mineral powders such as aluminium trihydroxide (ATH) in plastics. Improvements of flame retardant properties are demonstrated.

In a co-rotating twin screw extrusion machine (Brabender TSE 20/40) fitted with dosing feeders were compounded 40 wt % of aluminium trihydroxide (ATH), 47% of LDPE (Equistar Petrothene NA831000), 5% of MAH-g PE (Polybond 3009), antioxidants (Irganox 1010 & Irgafos 168) and 0.75% of surface treating agents such as n-propylsilicate functional dimethylsiloxane A1 compared to hydroxyl-terminated polydimethylsiloxane C13 supported onto porous LDPE (Membrana Accurel MP400). The composite was further molded into plates or dumbbell samples using an injection molding machine (Engel Victory 200/80 Tech) for further testing.

The fire resistance was determined via the LOI (Limited Oxygen Index) measurement according to the ISO 4589-2 standard method.

| Surface treating agent | LOI (%) |
|---|---|
| C13 | 23.7 |
| A1 | 26.2 |

Addition of propylsilicate functional polydimethylsiloxane A1 compared to conventional treating agents is significantly improving the fire resistance of the composite already at only 40% loading of ATH. Further improvements are observed at higher ATH loading such as 60 to 70%.

Flame retardant properties improvements are critical for a very large set of filler-plastic combinations such as halogenated, non-halogenated or phosphorus-containing flame retardants in e.g. polyethylene and/or EVA in applications such as cable and wiring, construction, household applications e.g. appliances, automotive, etc.

The following examples demonstrate the properties benefits of using a surface treating agent as per the invention compared to none or to conventional agent for mineral powders, pigments and/or filler such as wood flour in plastics. Improvements of processing conditions, weather resistance/durability, and mechanical properties critical for applications such as for decking, pallets, outdoor or interior furniture or automotive door panels are demonstrated.

In a co-rotating twin screw extrusion machine (Brabender TSE 20/40) fitted with dosing feeders were compounded 45 wt % of pine wood flour, 44% of PE (Basell Purell Ga7760), antioxidants (Irganox 1010 & Irganox 1330), 2.5% of MAH-g LLDPE (Fusabond 226D), and 2.5% of surface treating agents such as aminopropylsilicate functional polydimethylsiloxane A6 compared to hydroxyl-terminated polydimethylsiloxane C14 or aminopropyltriethoxysilane C15 supported onto porous PE (Accurel XP200). The composite was further pressed into plates using a platen press (Agila PE30) and cut into dumbbell samples using a cutting mill (Ray-Ran CNC Profile Cutter) for further testing.

Mechanical testing (strength at break, elongation at break) was performed on a Zwick 1445 tensile machine. Water uptakes were measured by immersion test (weight % increase of the sample over time).

Are compiled below the compared water uptake over time of composites prepared without any surface treating agent (and no MAH-g LLDPE), with MAH-g LLDPE & hydroxyl-terminated polydimethylsiloxane C14, or aminopropylltriethosysilane C15 or with aminopropylsilicate functional polydimethylsiloxane A6.

| Surface treating agent | Strength at break (MPa) | Elongation at break (%) | Water uptake after 28 days (%) |
|---|---|---|---|
| None | 15.8 | 0.8 | 10.7 |
| MAH-g LLDPE | 20.8 | 0.9 | 7.9 |
| C14 | 14.7 | 0.9 | 7.5 |
| C15 | 20.5 | 0.9 | 8.1 |
| A6 | 25.4 | 1.1 | 5.5 |

Although the use of MAH-g LLDPE is known to improve strength and reduce water uptake compared to untreated wood. Usage of conventional surface treating agents is detrimental to the strength and water uptake properties in comparison to aminopropylsilicate functional polydimethylsiloxane A6 where strength, elongation at break are improved while reducing significantly the water uptake.

In a co-rotating twin screw extrusion machine (Brabender TSE 20/40) fitted with dosing feeders were compounded 30 wt % of pine wood flour, 55 to 60% of PE (Basell Purell Ga7760), 0.3% of dicumyl peroxide (Luperox DC 40P), antioxidants (Irganox 1010 & Irganox 1330) and 3% of surface treating agents such vinylsilicate functional polydimethylsiloxane A2 compared to vinyltrimethoxysilane C16 supported onto porous PE (Accurel XP200). The composite was further pressed into plates using a platen press (Agila PE30) and cut into dumbbell samples using a cutting mill (Ray-Ran CNC Profile Cutter) for further testing. The extrusion torque was recorded during compounding. Mechanical testing (strength at break, elongation at break) was performed on a Zwick 1445 tensile machine. Water uptakes were measured by immersion test (weight % increase of the sample over time).

Are compiled below the compared properties of composites prepared without any surface treating agent, with vinyltrimethoxysilane C16 or with vinylsilicate functional polydimethylsiloxane A2.

| Surface treating agent | Strength at break (MPa) | Elongation at break (%) | Water uptake after 42 days (%) |
|---|---|---|---|
| None | 18.7 | 1.1 | 4.5 |
| C16 | 29.7 | 2.0 | 1.7 |
| A2 | 31.5 | 2.4 | 1.7 |

The use of vinylsilicate functional polydimethylsiloxane A2 compared to conventional treating agents is further improving strength and elongation at break while reducing significantly the water uptake.

In a co-rotating twin screw extrusion machine (Brabender TSE 20/40) fitted with dosing feeders were compounded 30 wt % of pine wood flour, 55 to 60% of PE (Basell Purell Ga7760), 0.3% of dicumyl peroxide (Luperox DC 40P), antioxidants (Irganox 1010 & Irganox 1330) and 3% of surface treating agents such as vinylsilicate functional polydimethylsiloxane A3 and A4 compared to vinyltrimethoxysilane C17, or a blend of vinylsilicate functional polydimethylsiloxane A3 with methoxysilicate functional polydimethylsiloxane A8 supported onto porous PE (Accurel XP200). The extrusion torque was recorded during compounding and is reported below:

| Surface treating agent | Torque (Nm) |
|---|---|
| None | 46 |
| C17 | 53 |
| A3 | 43 |
| A4 | 33 |
| A3/A8 blend | 29 |

The use of vinylsilicate functional polydimethylsiloxane A3 and A4, or a blend of A3 and A8 compared to conventional treating agents is significantly reducing the extrusion torque while reducing the surface roughness of the composite. This leads to important process energy savings, increase production throughput or increase of loading of the cheaper wood filler compared to polymeric matrix.

The invention claimed is:

1. A filler, pigment or mineral powder surface treated by chemical interaction with a silicon compound, wherein the silicon compound is a polydiorganosiloxane having at least two terminal groups of the formula —SiR"(OR')$_2$, wherein R" represents an alkyl, substituted alkyl, alkenyl or aryl group and each R' represents an alkyl group having 1 to 4 carbon atoms, wherein the polydiorganosiloxane has a vapour pressure lower than 2000 Pa at 25° C.

2. The treated filler, pigment or mineral powder according to claim 1 wherein R" represents an alkyl group having 3 to 8 carbon atoms.

3. The treated filler, pigment or mineral powder according to claim 1 wherein the degree of polymerisation of the polydiorganosiloxane is 4 to 250 siloxane units.

4. The treated filler, pigment or mineral powder according to claim 1 wherein the polydiorganosiloxane is derived from the reaction of a hydroxyl-terminated polydiorganosiloxane with an alkoxysilane of the formula R"Si(OR')$_3$ in the presence of a catalyst for the condensation of silanol groups with Si-alkoxy groups, wherein R" represents an alkyl, substituted alkyl, alkenyl or aryl group and each R' represents an alkyl group having 1 to 4 carbon atoms.

5. The treated filler, pigment or mineral powder according to claim 1 wherein the polydiorganosiloxane is a linear polydiorganosiloxane.

6. The treated filler, pigment or mineral powder according to claim 1 wherein the polydiorganosiloxane is a branched polydiorganosiloxane.

7. The treated filler, pigment or mineral powder according to claim 6 wherein the polydiorganosiloxane contains branching sites derived from the reaction of a molecule of an alkoxysilane of the formula R"Si(OR')$_3$ with at least 3 silanol groups of a hydroxyl-terminated polydiorganosiloxane, wherein R" represents an alkyl, substituted alkyl, alkenyl or aryl group and each R' represents an alkyl group having 1 to 4 carbon atoms.

8. The treated filler, pigment or mineral powder according to claim 6 wherein the polydiorganosiloxane contains branching sites derived from the reaction of a hydroxyl-terminated polydiorganosiloxane with an alkoxysilane of the formula R"Si(OR')$_3$ in the presence of a branched organosilicon resin and a catalyst for the condensation of silanol groups with Si-alkoxy groups, wherein R" represents an alkyl, substituted alkyl, alkenyl or aryl group and each R' represents an alkyl group having 1 to 4 carbon atoms.

9. The treated filler, pigment or mineral powder according to claim 6 wherein the polydiorganosiloxane contains branching sites derived from the reaction of a branched hydroxyl-terminated polydiorganosiloxane with an alkoxysilane of the formula R"Si(OR')$_3$, wherein R" represents an alkyl, substituted alkyl, alkenyl or aryl group and each R' represents an alkyl group having 1 to 4 carbon atoms.

10. A process for the surface treatment of a filler, pigment or mineral powder with a silicon compound, wherein the silicon compound is a polydiorganosiloxane having at least two terminal groups of the formula —SiR"(OR')$_2$, wherein R" represents an alkyl, substituted alkyl, alkenyl or aryl group and each R' represents an alkyl group having 1 to 4 carbon atoms, wherein the surface treatment includes chemical interaction between the surface and the silicon compound, and wherein the polydiorganosiloxane has a vapour pressure lower than 2000 Pa at 25° C.

11. The process according to claim 10, wherein the filler, pigment or mineral powder is treated with a mixture of the polydiorganosiloxane and an aminosilane or aminosiloxane.

12. The process according to claim 10, wherein the filler, pigment or mineral powder is treated with a mixture of the polydiorganosiloxane and a nonlinear organosilicon resin containing Si—OH groups or Si-alkoxy groups.

13. A plastics or rubber composition wherein the plastics o rubberr contains the filler or pigment as claimed in claim 1.

14. A process for producing a plastics or rubber composition wherein the filler or pigment as claimed in claim 1 is mixed with a plastics or rubber matrix material.

15. A process for producing a plastics or rubber composition, wherein an organic plastics or rubber matrix material is mixed with a filler or pigment and a polydiorganosiloxane having at least two terminal groups of the formula —SiR"(OR')$_2$, wherein R" represents an alkyl, substituted alkyl, alkenyl or aryl group and each R' represents an alkyl group having 1 to 4 carbon atoms, wherein a surface of the filler or pigment is treated by chemical interaction with the polydiorganosiloxane, and wherein the polydiorganosiloxane has a vapour pressure lower than 2000 Pa at 25° C.

16. The treated filler, pigment or mineral powder according to claim 1 wherein R" represents propyl, vinyl, aminopropyl, phenyl, methacryloxypropyl, or glycidoxypropyl, and wherein R' represents methyl or ethyl.

17. The treated filler, pigment or mineral powder according to claim 1 wherein the treated filler, pigment or mineral powder is hydrophobic.

18. The treated filler, pigment or mineral powder according to claim 1, wherein R" represents propyl, haloalkyl, aminopropyl, phenylmethyl, vinylbenzylethylenediaminepropyl, methacryloxypropyl, or glycidoxypropyl.

* * * * *